United States Patent
Chang et al.

(10) Patent No.: US 10,752,764 B2
(45) Date of Patent: Aug. 25, 2020

(54) COMPOSITIONS AND METHODS FOR CROSSLINKING POLYMERS IN THE PRESENCE OF ATMOSPHERIC OXYGEN

(71) Applicant: Arkema Inc., King of Prussia, PA (US)

(72) Inventors: Feng-Jon Chang, Taipei (TW); William P. Pavlek, Stevens, PA (US); Leonard H. Palys, Downingtown, PA (US); Peter R. Dluzneski, Harleysville, PA (US); Marina Despotopoulou, Havertown, PA (US); Alfredo Defrancisci, Lyons (FR); Joseph M. Brennan, Swarthmore, PA (US); Michael B. Abrams, Bala Cynwyd, PA (US); Isabelle Tartarin, Oullins (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/531,742

(22) PCT Filed: Dec. 3, 2015

(86) PCT No.: PCT/US2015/063617
§ 371 (c)(1),
(2) Date: May 31, 2017

(87) PCT Pub. No.: WO2016/094164
PCT Pub. Date: Jun. 16, 2016

(65) Prior Publication Data
US 2017/0267855 A1    Sep. 21, 2017

Related U.S. Application Data

(60) Provisional application No. 62/089,398, filed on Dec. 9, 2014.

(51) Int. Cl.
| | | |
|---|---|---|
| C08L 23/16 | (2006.01) | |
| C08L 1/08 | (2006.01) | |
| C08L 23/08 | (2006.01) | |
| C08K 5/14 | (2006.01) | |
| C08J 3/24 | (2006.01) | |

(52) U.S. Cl.
CPC .......... C08L 23/16 (2013.01); C08J 3/24 (2013.01); C08K 5/14 (2013.01); C08L 1/08 (2013.01); C08L 23/0869 (2013.01); C08J 2323/16 (2013.01); C08J 2401/14 (2013.01); C08L 2310/00 (2013.01); C08L 2312/00 (2013.01)

(58) Field of Classification Search
CPC .................... C08J 3/24; C08K 5/14
See application file for complete search history.

(56) References Cited

U.S. PATENT DOCUMENTS

| 4,358,553 A * | 11/1982 | Coran ................ C08L 1/10 524/37 |
|---|---|---|
| 4,376,184 A | 3/1983 | Itoh et al. |
| 4,739,036 A * | 4/1988 | Colvin ............... C07G 17/004 106/287.32 |
| 4,983,685 A | 1/1991 | Aoshima et al. |
| 5,120,779 A | 6/1992 | Cornell et al. |
| 5,219,904 A | 6/1993 | Abe et al. |
| 5,880,181 A * | 3/1999 | Torenbeek ........... C08F 299/04 523/506 |
| 6,747,099 B1 | 6/2004 | Novits et al. |
| 6,775,848 B2 | 8/2004 | McGlothlin et al. |
| 7,730,919 B2 | 6/2010 | Kanenari |
| 2004/0132912 A1* | 7/2004 | McElwee .............. C08K 5/098 525/326.1 |
| 2006/0251908 A1* | 11/2006 | Fukasawa ................ B60C 1/00 428/448 |
| 2007/0010609 A1* | 1/2007 | Reynolds ............ C08F 283/006 524/451 |
| 2008/0051498 A1* | 2/2008 | Kodama ................ B29C 41/14 524/394 |
| 2009/0105424 A1* | 4/2009 | Kodama ................ B29C 41/14 525/331.9 |
| 2009/0278284 A1 | 11/2009 | Kodama |
| 2010/0076118 A1* | 3/2010 | Yano ....................... B60C 1/00 523/351 |

(Continued)

FOREIGN PATENT DOCUMENTS

| CN | 102585467 | 7/2012 |
|---|---|---|
| CN | 103756031 | 4/2014 |

(Continued)

OTHER PUBLICATIONS

Di-Cup (Di-Cup Dicumyl Peroxide, https://www.arkenna.ca/export/shared/.content/media/downloads/products-documentations/organic-peroxides/dicup-tds.pdf, 2009) (Year: 2009).*

*Primary Examiner* — Liam J Heincer
(74) *Attorney, Agent, or Firm* — Lynn B. Morreale

(57) ABSTRACT

An organic peroxide formulation includes at least one organic peroxide and at least one cellulose compound. Embodiments of the organic peroxide formulations significant improvements in surface tackiness (often including but not limited to tack-free surfaces) when curing elastomers in the presence of oxygen. Embodiments of the present invention relate to organic peroxide formulations that can cure solid elastomers in the full or partial presence of oxygen using, for example, a hot air oven or tunnel, molten salt bath, or steam autoclave. Embodiments of the invention also relate to crosslinkable elastomer compositions, processes for curing the elastomers, and products made by such processes.

10 Claims, No Drawings

(56) References Cited

U.S. PATENT DOCUMENTS

| | | | |
|---|---|---|---|
| 2010/0183859 A1* | 7/2010 | Dieudonne | B29C 41/14 |
| | | | 428/220 |
| 2011/0147986 A1 | 6/2011 | D'Angelo | |
| 2011/0319529 A1 | 12/2011 | Helmer et al. | |
| 2011/0319530 A1 | 12/2011 | Helmer et al. | |
| 2011/0319532 A1* | 12/2011 | Helmer | C08L 1/10 |
| | | | 524/40 |
| 2012/0258177 A1* | 10/2012 | Goldstein | A61K 8/11 |
| | | | 424/494 |
| 2013/0056123 A1 | 3/2013 | Tomoi et al. | |
| 2013/0131221 A1* | 5/2013 | Basu | C08L 1/10 |
| | | | 524/32 |
| 2013/0150500 A1* | 6/2013 | Shelby | C08K 5/1545 |
| | | | 524/41 |
| 2013/0150501 A1* | 6/2013 | Basu | C08L 1/12 |
| | | | 524/41 |
| 2014/0105948 A1* | 4/2014 | Gebreselassie | A61K 8/38 |
| | | | 424/401 |

FOREIGN PATENT DOCUMENTS

| | | |
|---|---|---|
| EP | 0 246 745 B2 | 1/2001 |
| EP | 1 698 456 A1 | 9/2006 |
| EP | 1 889 712 A1 | 2/2008 |
| JP | S5736139 | 2/1982 |
| JP | 2004250608 | 9/2004 |
| JP | 2009235171 | 10/2009 |
| JP | 2009237057 | 10/2009 |
| JP | 2014141637 | 8/2014 |
| WO | WO 2009/011784 A1 | 1/2009 |

\* cited by examiner

COMPOSITIONS AND METHODS FOR CROSSLINKING POLYMERS IN THE PRESENCE OF ATMOSPHERIC OXYGEN

CROSS-REFERENCE TO RELATED APPLICATIONS

This application is a national stage application under 35 U.S.C. § 371 of PCT/US2015/063617 filed Dec. 3, 2015, which claims benefit to U.S. patent application Ser. No. 62/089,398, filed, Dec. 9, 2014.

FIELD OF THE INVENTION

The present invention relates to compositions and methods for crosslinking elastomers with organic peroxides in the presence of atmospheric oxygen, and products made by those methods.

BACKGROUND OF THE INVENTION

Polymers and copolymers crosslinked with organic peroxides are known to have superior properties, particularly compared to polymers crosslinked by sulfur cure. These properties include high heat aging resistance, low percent compression set, decreased staining of metal, and easy production of colored products with enhanced color stability. In view of these beneficial properties, peroxide cure has a great deal of practical importance. A possible drawback of peroxide cure is that air must be excluded from the surface of a material during cure; if the air is not excluded, a tacky surface may result, due to cure inhibition by oxygen.

When oxygen comes into contact with an elastomer being crosslinked by an organic peroxide, the crosslinking reaction at the elastomer surface may be inhibited, or may not take place at all. Thus, the elastomer surface remains uncured. Therefore, curing rubber articles with peroxides is typically conducted in steam tubes, steam autoclaves, and air-evacuated closed molds designed to apply heat to the elastomer while excluding atmospheric oxygen during the crosslinking process.

Unfortunately, excluding air from these commercial processes involves considerable time and expense. In contrast, sulfur vulcanization of elastomers can be conducted using lower cost hot air ovens or tubes in which hot atmospheric oxygen poses no issue. While the sulfur curatives are generally lower in cost than organic peroxides, the types of elastomers suitable for sulfur cure are limited to unsaturated elastomers, e.g., poly(ethylene propylene diene), poly(butadiene), natural rubber, synthetic poly(isoprene), poly(styrene-butadiene) rubber, poly(butadiene-acrylonitrile) rubber and the like.

In many cases, manufacturers would like to switch from sulfur to peroxide cure using existing hot air ovens; however, curing with conventional peroxide systems under these circumstances would not be commercially viable due to the surface cure inhibition by oxygen. Various methods have been suggested for preventing surface cure inhibition by oxygen during free radical crosslinking. These methods have generally met with little acceptance.

U.S. Pat. No. 6,747,099 is directed to elastomer compositions that include bis-, tri- or higher polymaleimides and/or bis-, tri- or higher polycitraconimides.

U.S. Pat. No. 4,983,685 is directed to elastomer compositions that include at least 2.5 to 20 phr (parts per hundred rubber) of benzothiazyl disulfide.

U.S. Pat. No. 6,775,848 is directed to pore-free rubber articles prepared by dip-molding.

U.S. Pat. No. 4,376,184 is directed to rubber compositions that include an organopolysiloxane gum.

EP 0246745 is directed to elastomer compositions that include low molecular weight polymers of 1,000 to 15,000 as an additive.

U.S. Pat. No. 5,219,904 is directed to fluorine-containing elastomers that contain iodine and bromine.

U.S. Publication No. 2013/0131221 is directed to elastomer compositions that include at least one cellulose ester.

Generally, none of the previously described systems adequately provide a tack-free surface while concurrently providing desirable physical properties like superior compression. Moreover, previous known methods involving sulfur and peroxide cure typically are limited to unsaturated elastomers.

Thus, it is desirable to have organic peroxide formulations and methods which cure commercially available crosslinkable elastomers and polymers, both saturated and unsaturated, in the full or partial presence of atmospheric oxygen.

SUMMARY OF THE INVENTION

Embodiments of the present invention relate to organic peroxide formulations that can cure solid elastomers in the full or partial presence of oxygen using, for example, a hot air oven or tunnel, molten salt bath, or steam autoclave. Embodiments of the invention also relate to crosslinkable elastomer compositions, processes for curing the elastomers, and products made by such processes.

The applicants have discovered that cellulose compounds can be combined with organic peroxides to significantly reduce the surface tackiness of elastomeric articles cured in the presence of oxygen. Embodiments of the present invention relate to an organic peroxide formulation comprising, consisting essentially of, or consisting of at least one organic peroxide and at least cellulose compound. The amounts of the at least one organic peroxide and the at least one cellulose compound are selected such that the formulation is capable of curing an elastomer composition in the full or partial presence of oxygen (e.g., using a hot air oven or tunnel, or steam autoclave).

Embodiments of the present invention also relate to an elastomer composition comprising, consisting essentially of, or consisting of at least one elastomer, at least one peroxide, and at least cellulose compound, wherein the elastomer composition is curable in the full or partial presence of oxygen.

Embodiments of the present invention also relate to a process for curing an elastomer composition, said process comprising, consisting essentially of, or consisting of curing an elastomer composition in the presence of oxygen, wherein the elastomer composition comprises, consists essentially of, or consists of at least one elastomer, at least one organic peroxide and at least one cellulose compound. Embodiments of the present invention also relate to products made by this process.

DETAILED DESCRIPTION

The applicants have discovered organic peroxide formulations that provide significant improvements in surface tackiness, including but not limited to tack-free surfaces, when curing elastomers in the full or partial presence of oxygen (e.g., using a hot air oven or tunnel, or a steam autoclave). Therefore, organic peroxide compositions of the present invention can replace sulfur vulcanization in cure processes where oxygen (e.g., atmospheric oxygen) may be present in various amounts.

When heat and pressure are applied to a sulfur-cured elastomer, the sulfur bonds typically break and re-form, causing the elastomer to deform. One test to measure this deformation is a percentage (%) compression set test. The greater the deformation under heat and pressure, the higher the measured % compression set value. Thus, lower % compression set values are desirable for many elastomers, particularly for hose, gasket and sealing applications.

Elastomers that are cured using organic peroxide compositions of the present invention may include solid unsaturated elastomers, solid saturated elastomers, or combinations thereof. U.S. Pat. No. 6,747,099, which is incorporated by reference herein, discloses the use of organic peroxides in the presence of air. Embodiments of the present invention provide improvements over formulations taught in U.S. Pat. No. 6,747,099, which do not provide sufficiently tack-free surfaces when elastomers with little or no unsaturation are used (e.g., EPM, ethylene-propylene copolymer). For example, embodiments of the present invention can obtain surface cures with blends of ethylene-propylene-diene terpolymer (EPDM) and EPM (thus significantly reduced unsaturation) substantially identical to those obtained with elastomers that have high unsaturation, such as EPDM. Thus, embodiments of the invention are not limited by the unsaturation level of elastomers.

One aspect of the present invention relates to an organic peroxide formulation comprising, consisting essentially of, or consisting of at least one organic peroxide and at least one cellulose compound. According to particular embodiments, the organic peroxide formulations of the present invention are capable of providing a completely or substantially tack-free cured elastomer composition. As used herein, an elastomer composition that is substantially tack-free has a surface tackiness of between 7 and 9.9 or 10, preferably between 7 and 9.9, more preferably between 8 and 9.9 or 10, and more preferably between 9 and 9.9 or 10. An elastomer composition that is completely tack-free has a surface tackiness of 10 and is most desirable. A method for measuring surface tackiness is provided herein, and is referred to as the Facial Tissue Paper Test.

According to particular embodiments, the organic peroxide formulations of the present invention are capable of curing an elastomer composition that includes at least one saturated elastomer (e.g., a blend of at least one saturated elastomer and at least one unsaturated elastomer) in the full or partial presence of oxygen, wherein the cured elastomer composition is completely or substantially tack-free.

Organic Peroxides Suitable for Use in Embodiments of the Present Invention

With the exception of hydroperoxides and liquid peroxydicarbonates, all organic peroxides known to undergo decomposition by heat to generate radicals capable of initiating the desired curing (crosslinking) reactions are contemplated as suitable for use in the formulations of the present invention. Non-limiting examples include dialkyl peroxides, diperoxyketals, mono-peroxy carbonates, cyclic ketone peroxides, diacyl peroxides, organosulfonyl peroxides, peroxyesters and solid, room temperature stable peroxydicarbonates. In at least one embodiment, the organic peroxide is selected from dialkyl peroxides, peroxyketals, cyclic ketone peroxides and diacyl peroxides.

Peroxide names and physical properties for all these classes of organic peroxides can be found in "Organic Peroxides" by Jose Sanchez and Terry N. Myers; Kirk-Othmer Encyclopedia of Chemical Technology, Fourth Ed., Volume 18, (1996), the disclosure of which is incorporated herein by reference.

Illustrative dialkyl peroxide initiators include:
di-t-butyl peroxide;
t-butyl cumyl peroxide;
dicumyl peroxide;
2,5-di(cumylperoxy)-2,5-dimethyl hexane;
2,5-di(cumylperoxy)-2,5-dimethyl hexyne-3;
4-methyl-4-(t-butylperoxy)-2-pentanol;
4-methyl-4-(t-amylperoxy)-2-pentanol;
4-methyl-4-(cumylperoxy)-2-pentanol;
4-methyl-4-(t-butylperoxy)-2-pentanone;
4-methyl-4-(t-amylperoxy)-2-pentanone;
4-methyl-4-(cumylperoxy)-2-pentanone;
2,5-dimethyl-2,5-di(t-butylperoxy)hexane;
2,5-dimethyl-2,5-di(t-amylperoxy)hexane;
2,5-dimethyl-2,5-di(t-butylperoxy)hexyne-3;
2,5-dimethyl-2,5-di(t-amylperoxy)hexyne-3;
2,5-dimethyl-2-t-butylperoxy-5-hydroperoxyhexane;
2,5-dimethyl-2-cumylperoxy-5-hydroperoxy hexane;
2,5-dimethyl-2-t-amylperoxy-5-hydroperoxyhexane;
m/p-alpha, alpha-di(t-butylperoxy)isopropyllbenzene;
1,3,5-tris(t-butylperoxyisopropyl)benzene;
1,3,5-tris(t-amylperoxyisopropyl)benzene;
1,3,5-tris(cumylperoxyisopropyl)benzene;
di[1,3-dimethyl-3-(t-butylperoxy)butyl]carbonate;
di[1,3-dimethyl-3-(t-amylperoxy)butyl]carbonate;
di[1,3-dimethyl-3-(cumylperoxy)butyl]carbonate;
di-t-amyl peroxide;
t-amyl cumyl peroxide;
t-butylperoxy-isopropenylcumylperoxide;
2,4,6-tri(butylperoxy)-s-triazine;
1,3,5-tri[1-(t-butylperoxy)-1-methylethyl]benzene;
1,3,5-tri-[(t-butylperoxy)-isopropyl]benzene;
1,3-dimethyl-3-(t-butylperoxy)butanol;
1,3-dimethyl-3-(t-amylperoxy)butanol; and mixtures thereof.

Illustrative solid, room temperature stable peroxydicarbonates include, but are not limited to:
di(2-phenoxyethyl)peroxydicarbonate; di(4-t-butyl-cyclohexyl)peroxydicarbonate; dimyristyl peroxydicarbonate; dibenzyl peroxydicarbonate; and di(isobornyl)peroxydicarbonate.

Another class of dialkylperoxides which may be used singly or in combination with the other free radical initiators contemplated by the present disclosure are those selected from the group represented by the formula:

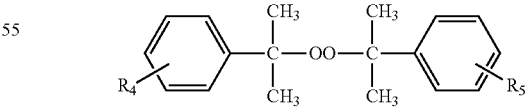

wherein $R_4$ and $R_5$ may independently be in the meta or para positions and are the same or different and are selected from hydrogen or straight or branched chain alkyls of 1 to 6 carbon atoms. Dicumyl peroxide and isopropylcumyl cumyl peroxide are illustrative.

Other dialkyl peroxides include:
3-cumylperoxy-1,3-dimethylbutyl methacrylate;
3-t-butylperoxy-1,3-dimethylbutyl methacrylate;

3-t-amylperoxy-1,3-dimethylbutyl methacrylate;
tri(1,3-dimethyl-3-t-butylperoxy butyloxy)vinyl silane;
1,3-dimethyl-3-(t-butylperoxy)butyl N-[1-{3-(1-methylethenyl)-phenyl}1-methylethyl]carbamate;
1,3-dimethyl-3-(t-amylperoxy)butyl N-[1-{3(1-methylethenyl)-phenyl}-1-methylethyl]carbamate;
1,3-dimethyl-3-(cumylperoxy))butyl N-[1-{3-(1-methylethenyl)-phenyl}-1-methylethyl]carbamate.

In the group of diperoxyketal initiators, the preferred initiators include:
1,1-di(t-butylperoxy)-3,3,5-trimethylcyclohexane;
1,1-di(t-butylperoxy)cyclohexane;
n-butyl 4,4-di(t-amylperoxy)valerate;
ethyl 3,3-di(t-butylperoxy)butyrate;
2,2-di(t-amylperoxy)propane;
3,6,6,9,9-pentamethyl-3-ethoxycabonylmethyl-1,2,4,5-tetraoxacyclononane;
n-butyl-4,4-bis(t-butylperoxy)valerate;
ethyl-3,3-di(t-amylperoxy)butyrate; and mixtures thereof.

Other peroxides that may be used according to at least one embodiment of the present disclosure include benzoyl peroxide, OO-t-butyl-O-hydrogen-monoperoxy-succinate and OO-t-amyl-O-hydrogen-monoperoxy-succinate.

Illustrative cyclic ketone peroxides are compounds having the general formulae (I), (II) and/or (III).

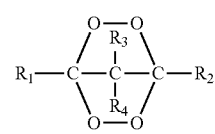

(I)

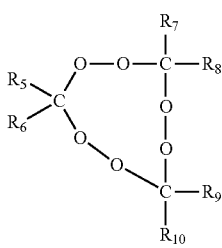

(II)

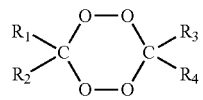

(III)

wherein $R_1$ to $R_{10}$ are independently selected from the group consisting of hydrogen, C1 to C20 alkyl, C3 to C20 cycloalkyl, C6 to C20 aryl, C7 to C20 aralkyl and C7 to C20 alkaryl, which groups may include linear or branched alkyl properties and each of $R_1$ to $R_{10}$ may be substituted with one or more groups selected from hydroxy, C1 to C20 alkoxy, linear or branched C1 to C20 alkyl, C6 to C20 aryloxy, halogen, ester, carboxy, nitride and amido, such as, for example, at least 20% of the total active oxygen content of the peroxide mixture used for a crosslinking reaction will be from compounds having formulas (I), (II) and/or (III).

Some examples of suitable cyclic ketone peroxides include:
3,6,9, triethyl-3,6,9-trimethyl-1,4,7-triperoxynonane (or methyl ethyl ketone peroxide cyclic trimer), methyl ethyl ketone peroxide cyclic dimer, and 3,3,6,6,9,9-hexamethyl-1,2,4,5-tetraoxacyclononane.

Illustrative examples of peroxy esters include:
2,5-dimethyl-2,5-di(benzoylperoxy)hexane;
t-butylperbenzoate;
t-butylperoxyacetate;
t-butylperoxy-2-ethyl hexanoate;
t-amylperbenzoate;
t-amyl peroxy acetate;
t-butyl peroxy isobutyrate;
3-hydroxy-1,1-dimethyl t-butyl peroxy-2-ethyl hexanoate;
OO-t-amyl-O-hydrogen-monoperoxy succinate;
OO-t-butyl-O-hydrogen-monoperoxy succinate;
di-t-butyl diperoxyphthalate;
t-butylperoxy (3,3,5-trimethylhexanoate);
1,4-bis(t-butylperoxycarbo)cyclohexane;
t-butylperoxy-3,5,5-trimethylhexanoate;
t-butyl-peroxy-(cis-3-carboxy)propionate;
allyl 3-methyl-3-t-butylperoxy butyrate.

Illustrative monoperoxy carbonates include:
OO-t-butyl-O-isopropylmonoperoxy carbonate;
OO-t-butyl-O-(2-ethyl hexyl)monoperoxy carbonate;
1,1,1-tris[2-(t-butylperoxy-carbonyloxy)ethoxymethyl]propane;
1,1,1-tris[2-(t-amylperoxy-carbonyloxy)ethoxymethyl]propane;
1,1,1-tris[2-(cumylperoxy-carbonyloxy)ethoxymethyl]propane;
OO-t-amyl-O-isopropylmonoperoxy carbonate.

Illustrative diacyl peroxides include:
di(4-methylbenzoyl)peroxide;
di(3-methylbenzoyl)peroxide;
di(2-methylbenzoyl)peroxide;
didecanoyl peroxide; dilauroyl peroxide;
2,4-dibromo-benzoyl peroxide;
succinic acid peroxide.
dibenzoyl peroxide;
di(2,4-dichloro-benzoyl)peroxide.

Imido peroxides of the type described in PCT Application publication WO9703961 A1 6 Feb. 1997 are also contemplated as suitable for use and incorporated by reference herein.

Preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; 004-butyl-O-isopropylmonoperoxy carbonate; polyether poly-t-butylperoxy carbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate.

More preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di (t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; dibenzoyl peroxide; di(2,4-dichlorobenzoyl)peroxide; cumene hydroperoxide; and di(4-tert-butylcyclohexyl)peroxydicarbonate.

Even more preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; m/p-di(t-butylperoxy)diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; t-butylperoxybenzoate; dibenzoyl peroxide; and di(2,4-dichlorobenzoyl) peroxide.

Most preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; m/p-di(t-butylperoxy)diisopropyl benzene; m-di(t-butylperoxy)diisopropyl benzene; p-di(t-butylperoxy)diisopropyl benzene; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; 004-butyl-O-isopropylmonoperoxy carbonate; and t-butylperoxybenzoate.

In accordance with additional embodiments, organic peroxide formulations of the present invention may further include at least one inert filler, such as silica filler.

Organic Peroxide Compositions Comprising Cellulose Compounds

According to an embodiment of the present invention, an organic peroxide formulation comprises, consists essentially of, or consists of at least one organic peroxide and at least one cellulose compound. The organic peroxide(s) and cellulose compound(s), and their respective amounts, are preferably selected such that the formulation is capable of curing an elastomer composition in the full or partial presence of oxygen (e.g., using a hot air oven or tunnel, or a steam autoclave).

Non-limiting examples of cellulose compounds suitable for use in the present invention include cellulose and its derivatives, including cellulose esters, cellulose ethers and combinations thereof; for example, cellulose acetate butyrate (CAB), cellulose acetate proprionate, cellulose acetate, cellulose, micronized cellulose, cellulose gum, microcrystalline cellulose, carboxymethyl cellulose, hydroxypropyl cellulose (HPC), hydroxypropylmethyl cellulose (HMPC), hydroxyethyl cellulose, methyl cellulose, ethyl cellulose, cellulose acetate phthalate, ethyl hydroxyethyl cellulose, hydroxyethyl methyl cellulose, ethyl methyl cellulose, and combinations thereof.

According to one of the particular embodiments, the organic peroxide formulation of the present invention comprises, consists essentially of, or consists of:

at least one organic peroxide (for example, in an amount from 20 wt % to 99 wt %, or from 30 wt % to 90 wt % or from 40 wt % to 75 wt %, or from 40 wt % to 70 wt %, or from 40 wt % to 65 wt %, or from 45 wt % to 80 wt %, or from 45 wt % to 75 wt %, or from 45 wt % to 70 wt %, or from 45 wt % to 65 wt %, or from 50 wt % to 98 wt %, or from 50 wt % to 75 wt %, or from 50 wt % to 70 wt %, or from 50 wt % to 65 wt %, from 50 wt % to 60 wt %, based on the total organic peroxide formulation);

at least one cellulose compound (for example, in an amount from 5 wt % to 70 wt %, or from 10 wt % to 50 wt %, or from 15 wt % to 45 wt %. or from 20 wt % to 70 wt %, or from 20 wt % to 65 wt %, or from 20 wt % to 60 wt %, or from 25 wt % to 70 wt %, or from 25 wt % to 65 wt %, or from 25 wt % to 60 wt %, or from 30 wt % to 70 wt %, or from 30 wt % to 65 wt %, or from 30 wt % to 60 wt %, or from 35 wt % to 70 wt %, or from 35 wt % to 65 wt %, or from 35 wt % to 60 wt %, or from 40 wt % to 70 wt %, or from 40 wt % to 65 wt %, or from 40 wt % to 60 wt %, or from 40 wt % to 55 wt %, or from 40 wt % to 50 wt %, based on the total organic peroxide formulation); and at least one optional inert filler (for example, in an amount from 0.01 wt % to 60 wt %, or from 0.01 wt % to 20 wt %, or from 0.01 wt % to 20 wt %, or from 0.01 wt % to 10 wt %, or from 0.01 wt % to 5 wt %, or from 0.01 wt % to 2 wt %, or from 0.01 wt % to 0.1 wt %, based on the total organic peroxide formulation), wherein the at least one peroxide and the at least one cellulose compound, and their respective amounts, are selected such that the formulation is capable of curing an elastomer composition in the full or partial presence of oxygen, and wherein the cured elastomer composition is substantially or completely tack-free.

According to particular embodiments, the at least one cellulose compound is selected from the group consisting of cellulose acetate butyrate (CAB), cellulose acetate proprionate, cellulose acetate, cellulose, micronized cellulose, cellulose gum, microcrystalline cellulose, carboxymethyl cellulose, hydroxypropyl cellulose (HPC), hydroxypropylmethyl cellulose (HMPC), hydroxyethyl cellulose, methyl cellulose, ethyl cellulose, cellulose acetate phthalate, ethyl hydroxyethyl cellulose, hydroxyethyl methyl cellulose, ethyl methyl cellulose and a combination thereof. According to one embodiment, the at least one cellulose compound comprises, consists essentially of, or consists of cellulose acetate butyrate (CAB).

Preferred cellulose compounds include cellulose acetate butyrate, cellulose acetate, cellulose, hydroxypropyl cellulose (HPC), hydroxypropylmethyl cellulose (HMPC), carboxymethyl cellulose, hydroxyethyl cellulose, and combinations thereof.

More preferred are include cellulose acetate butyrate where the butyryl percent content of the CAB is 20%, preferably 18% or less, cellulose acetate, cellulose, hydroxypropyl cellulose (HPC), hydroxypropylmethyl cellulose (HMPC), carboxymethyl cellulose, and combinations thereof.

An additional embodiment of the present invention provides an elastomer composition comprising, consisting essentially of, or consisting of:

at least one elastomer (either saturated, unsaturated, or both);

at least one organic peroxide, and at least one cellulose compound, wherein the elastomer composition is curable in the full or partial presence of oxygen (e.g., using a hot air oven or tunnel, or a steam autoclave). Preferably, the cured elastomer composition is completely or substantially tack-free.

According to particular embodiments, the elastomer composition comprises, consists essentially of, or consists of at least one elastomer (either saturated, unsaturated, or both); and at least one organic peroxide in an amount from 0.1 phr to 20 phr, or from 1 phr to 10 phr, or from 2.0 phr to 10.0 phr, or from 2.0 phr to 8.0 phr (parts per hundred rubber), or from 2.5 phr to 10.0 phr, or from 2.5 phr to 8.0 phr, or from 2.5 phr to 7.5 phr, or from 2.5 phr to 7.0 phr, or from 2.5 phr to 6.5 phr, or from 2.5 phr to 6.0 phr, or from 3.0 phr to 10.0 phr, or from 3.0 phr to 8.0 phr, or from 3.0 phr to 7.5 phr, or from 3.0 phr to 7.0 phr, or from 3.0 phr to 6.5 phr, or from 3.0 phr to 6.0 phr, or from 3.5 phr to 10.0 phr, or from 3.5 phr to 8.0 phr, or from 3.5 phr to 7.5 phr, or from 3.5 phr to 6.5 phr, or from 4.0 phr to 10.0 phr, or from 4.0 phr to 8.0 phr, or from 4.0 phr to 7.0 phr;

at least one cellulose compound in an amount from 0.1 phr to 20 phr, or from 1 phr to 10 phr, or from 2.0 phr to 10.0 phr, or from 2.0 phr to 8.0 phr (parts per hundred rubber), or from 2.5 phr to 10.0 phr, or from 2.5 phr to 8.0 phr, or from 2.5 phr to 7.5 phr, or from 2.5 phr to 7.0 phr, or from 2.5 phr to 6.5 phr, or from 2.5 phr to 6.0 phr, or from 2.5 phr to 5.5 phr, or from 3.0 phr to 6.5 phr, or from 3.0 phr to 6.0 phr, or from 3.0 phr to 5.5 phr, or from 3.5 phr to 6.5 phr, or from 3.5 phr to 6.0 phr, or from 3.5 phr to 5.5 phr; and optionally at least one additive selected from the group consisting of process oils (e.g., aliphatic process oils), process aids, pigments, dyes, tackifiers, waxes, reinforcing aids, UV stabilization agents, blowing agents, scorch protectors, activators, antiozonants and coagents (e.g., those marketed by Sartomer).

The coagents which can be considered for use in this invention include those compounds marketed by Sartomer, Cray Valley, DuPont and others that comprise the following functionality with and without scorch protected additives: difunctional allylic, trifunctional allylic, difunctional acrylic, trifunctional acrylic, difunctional methacrylic, trifunctional methacrylic, divinyl, trivinyl, bis-, tri- or higher polymaleimide and/or bis-, tri- or higher polycitraconimide functionality including the various higher molecular weight oligomeric varieties with at least one or more of these chemical functionalities. Specialty dual functional coagents, including, for example, allylic and methacrylic coagents like Sartomer SR® 523, available from Arkema Inc. are also preferred in this invention.

The coagents suitable for use in this invention include but are not limited to: triallyl cyanurate, triallyl isocyanurate, ethylene glycol dimethacryate, polybutadiene diacrylate, allylmethacrylate, allylmethacrylate oligomers, trimethylolpropanetrimethacrylate, trimethylolpropane triacrylate, zinc diacrylate, zinc dimethacrylate; N,N'-phenylenebismaleimide, also known as HVA-2, from DuPont. Other suitable coagents may be bio-based, for example tung oil and linseed oil. These coagents can be used singularly or in various blends or combinations in an elastomer formulation.

According to particular embodiments, the cellulose compound(s) in the organic peroxide formulation include cellulose acetate butyrate (CAB). The butyryl content of the cellulose acetate butyrate is preferably between about 10% and about 60%, or between about 15% and about 60%, or between about 1% and about 30%, or between about 1% and about 25%, or between about 1% and about 20%, or between about 15% and about 60%, or between about 17% and about 54%, or less than 50%, or less than 40%, more preferably less than 30%, and most preferably less than 20%.

The ratio of the at least one cellulose compound to the at least one organic peroxide is not particularly limited, but may be between about 1:about 0.1 and about 1:about 10; for example, about 1:about 0.2, about 1:about 0.4, about 1:about 0.8, about 1:about 1, about 1:about 2, about 1:about 1.6, about 1:about 2.4, about 1: about 3.2, or about 1:about 5.

According to particular embodiments, an elastomer composition of the present invention comprising, consisting essentially of, or consisting of at least one elastomer (either saturated, unsaturated, or both), at least one organic peroxide and at least one cellulose compound, which has been cured in the full or partial presence of oxygen, has less surface tackiness in comparison to an elastomer composition that has been cured according to the same process and that has an identical composition except that it does not include any cellulose compounds.

According to additional embodiments of the present invention, the organic peroxide formulation further comprises at least one sulfur-containing compound. According to these embodiments, the organic peroxide formulation comprises, consists essentially of, or consists of at least one organic peroxide, at least one cellulose compound, and at least one sulfur-containing compound, wherein the organic peroxide(s), cellulose compound(s), and sulfur-containing compound(s), and their respective amounts, are preferably selected such that the formulation is capable of curing an elastomer composition in the full or partial presence of oxygen (e.g., using a hot air oven or tunnel, or a steam autoclave).

Sulfur-containing compounds listed in the "R. T. Vanderbilt Rubber Handbook", 13th Ed. (1990), which is incorporated herein by reference, may be considered for use in the practice of this invention.

Sulfur-containing compounds suitable for use in the present invention include, but are not limited to, organic sulfide compounds, which may be monosulfides, disulfides, trisulfides or higher polysulfides.

The preferred sulfur-containing compounds used in embodiments of the invention are those that contain the general disulfide or trisulfide type structure:

$(R_1\text{—}SS\text{—}R_2)_x$ or $(R_1\text{—}SSS\text{—}R_2)_x$, where $R_1$ or $R_2$ may be the same structure or different, and may be saturated or unsaturated; and x=1 and/or x≥2 to include polymeric structures, e.g., the Vultac® disulfides. $R_1$ and $R_2$ may, for example, be aromatic groups such as phenyl groups, which may be substituted, such as with hydroxyl and/or alkyl groups; non-aromatic cyclic groups, such as morpholine groups or caprolactam groups, with sulfur-nitrogen bonds being present; and/or benzothiazyl groups.

Dimeric and polymeric alkylphenol polysulfides (also referred to as poly(alkylphenol)polysulfides) are one type of sulfur-containing compound which may be utilized in the present invention. The alkylphenol may be tert-butyl phenol or tert-amyl phenol, for example. Such substances and methods for their synthesis are described in U.S. Pat. Nos. 2,422,156; 3,812,192; 3,968,062; 3,992,362; 6,303,746; 7,294,684; and 8,063,155, each of which is incorporated herein by reference in its entirety for all purposes.

The disulfides and trisulfides may be biobased (e.g., garlic and onion oils) or non-biobased compounds.

Illustrative preferred sulfur-containing compounds include but are not limited to, disulfides, including poly (substitutedphenol disulfides) and:

Vultac® 5=poly(t-amylphenol disulfide);
Vultac® 7=poly(t-butylphenol disulfide);
Vanax® A=DTDM=4,4-dithiodimorpholine;
Altax®=MBTS=benzothiazyl disulfide;
and
CLD-80=N,N'-Caprolactam disulfide.

According to particular embodiments, the at least one sulfur-containing compound is selected from the group consisting of poly(t-amylphenol disulfide); poly(t-butylphenol disulfide); 4,4-dithiodimorpholine; benzothiazyl disulfide; N,N'-caprolactam disulfide; and a combination thereof. According to further embodiments, the at least one sulfur-containing compound includes benzothiazyl disulfide and at least one additional sulfur-containing compound (e.g., poly (t-amylphenol disulfide); poly(t-butylphenol disulfide); 4,4-dithiodimorpholine; or N,N'-caprolactam disulfide).

An additional embodiment of the present invention provides an elastomer composition comprising, consisting essentially of, or consisting of: at least one elastomer (either saturated, unsaturated, or both);

at least one organic peroxide,
at least one cellulose compound, and
at least one sulfur-containing compound, wherein the elastomer composition is curable in the full or partial presence of oxygen (e.g., using a hot air oven or tunnel, or a steam autoclave). Preferably, the cured elastomer composition is completely or substantially tack-free.

According to another embodiment of the present invention, the organic peroxide formulation comprises at least one nitroxide (e.g., 4-hydroxy-TEMPO (4-OHT)) and at least one quinone (e.g., mono-tert-butylhydroquinone (MTBHQ)). According to these embodiments, the organic peroxide formulation preferably comprises, consists essentially of, or consists of at least one organic peroxide, at least one cellulose compound, at least one sulfur-containing compound, at least one nitroxide (e.g., 4-hydroxy-TEMPO (4-OHT)) and at least one quinone (e.g., mono-tert-butylhydroquinone (MTBHQ)), wherein the components, and their respective amounts, are preferably selected such that the formulation is capable of curing an elastomer composition in the full or partial presence of oxygen (e.g., using a hot air oven or tunnel, or a steam autoclave). As used herein, the terms "quinone" or "quinone-containing compound" include both quinones and hydroquinones as well as ethers thereof such as monoalkyl, monoaryl, monoaralkyl and bis(hydroxyalkyl) ethers of hydroquinones.

An additional embodiment of the present invention provides an elastomer composition comprising, consisting essentially of, or consisting of:

at least one elastomer (either saturated, unsaturated, or both);
at least one organic peroxide,
at least one cellulose compound,
at least one sulfur-containing compound,
at least one nitroxide, and
at least one quinone, wherein the elastomer composition is curable in the full or partial presence of oxygen (e.g., using a hot air oven or tunnel, or a steam autoclave). Preferably, the cured elastomer composition is completely or substantially tack-free.

Elastomers Suitable for Use in Embodiments of the Present Invention

In at least one embodiment, the elastomer compositions of the present invention may comprise a saturated elastomer, an unsaturated elastomer, or a blend of both a saturated and unsaturated elastomer.

According to particular embodiments, the elastomer compositions of the present invention further comprise at least one polymer. The at least one polymer of the elastomer composition may comprise a saturated polymer, an unsaturated polymer, or both a saturated and unsaturated polymer.

It should be noted that commercially-available pre-compounded elastomers may be used in accordance with the present invention. These elastomers may contain additives such as carbon black filler, process oils, mold release agents, antioxidants and/or heat stabilizers. According to particular embodiments, the at least one elastomer is part of an elastomer masterbatch that includes one or more of these additives. For example, an elastomer masterbatch may comprise, consist essentially of, or consist of the at least one elastomer and one or more additives selected from the group consisting of carbon black, polyethylene glycol, at least one process oil (e.g., liquid saturated hydrocarbons, such as Primol® 352), at least one antioxidant (e.g., 2,2,4-trimethyl-1,2-dihydroquinoline, also referred to as Stanguard® TMQ Powder), at least one mold release agent, at least one heat stabilizer, and a combination thereof.

As used herein, the term "polymer" means a non-elastomeric polymer comprised of at least at least one monomer in polymerized form. The term "polymer" encompasses homopolymers and copolymers, where the term "copolymers" refers to a polymer comprised of at least two different monomers in polymerized form. For example, a copolymer in accordance with the present disclosure may be a polymer comprising two different monomers, a terpolymer comprising three different monomers, or a polymer comprising three or more different monomers.

In at least one embodiment, the polymer of the elastomer composition comprises a copolymer. The embodiments disclosed herein recite elastomer compositions comprising a copolymer. However, as one of ordinary skill in the art would readily appreciate, a homopolymer may be substituted in any embodiment comprising a copolymer, unless expressly indicated to the contrary.

In at least one embodiment, the elastomer composition comprises at least one elastomer and at least one copolymer. The elastomer and copolymer may be present in the elastomer composition at weight ratios ranging from 99:1 to 1:99, such as, for example, from 85:15 to 15:85, or from 75:25 to 25:75. In at least one embodiment, the elastomer and copolymer are present in the elastomer composition in a 50:50 weight ratio.

According to at least one embodiment, the elastomer composition comprises at least one saturated elastomer. The saturated elastomer can be selected from, for example, silicon rubber without unsaturation (Q), methyl-polysiloxane (MQ), phenyl-methyl-polysiloxane (PMQ), poly(ethylene-vinyl acetate) (EVA), high-density polyethylene (HDPE), low-density polyethylene (LDPE), chlorinated poly(ethylene) (CM or CPE), poly(ethylene propylene) (EPM), fluoroelastomers (FKM, FFKM) (e.g., Viton® and Dyneon), and combinations thereof.

According to at least one embodiment, the elastomer composition comprises at least one unsaturated elastomer. Unsaturated elastomers that may be used in the elastomer composition include, for example, ethylene-propylene-diene terpolymer (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber (BIIR), chlorobutyl rubber, and combinations thereof.

According to particular embodiments, the elastomers of the present invention do not include fluorine-containing elastomers, and do not include elastomers that contain iodine or bromine.

In accordance with at least one embodiment, the elastomer composition comprises at least one saturated copolymer. Non-limiting examples of saturated polymers that may be used include copolymers of ethylene with propylene, butylene, pentene, hexene, heptene, octene, and vinyl acetate, such as, linear low density polyethylene (LLDPE), low density polyethylene (LDPE), high density polyethylene (HDPE), poly(ethylene vinyl acetate) (EVA), poly(ethylene-propylene) (EPM), poly(ethylene-α-olefins), poly(ethylene-octene) (e.g., Engage®), poly(ethylene-hexene), poly(ethylene-butylene) (e.g., Tafmer®), Vamac® polymers (e.g., poly(ethylene-methyl acrylate), poly(ethylene acrylate), and combinations with acrylic acid), and combinations thereof. When a foamed product is desired, the elastomer composition may comprise a blowing agent.

Additional non-limiting examples of elastomers and polymers suitable for use in the current invention include polyurethane (AU and EU), vinylidene fluoride copolymers (CFM), silicone rubber, chlorosulfonated polyethylene (CSM), 5-vinyl-2-norbornene-EPDM (e.g. Keltan® ACE EPDM), and polysulfide rubber.

According to particular embodiments, the elastomer compositions and organic peroxide formulations of the present invention do not include any organosiloxane gums, such as those described in U.S. Pat. No. 4,376,184. According to further embodiments, the elastomer compositions and organic peroxide formulations of the present invention do not include any polymer additives having a low molecular weight between 1,000 and 15,000, such as those described in EP 0246745. According to further embodiments, the elastomer compositions and organic peroxide formulations of the present invention do not include any zinc oxide.

One of skill in the art will be able to select suitable quantities of the various ingredients for use in the organic peroxide formulations and elastomer compositions and will be able to optimize the concentrations through trials employing increasing amounts of the ingredients in samples of the polymer to be cured (crosslinked). The optimum processing (compounding) time and temperatures and the like may also be determined as will the optimum cure time and temperature.

Embodiments of Methods of the Present Invention

At least one embodiment of the present invention relates to a method for manufacturing an article comprising an elastomer composition as described herein, wherein the method comprises curing the elastomer composition in the full or partial presence of oxygen (e.g., using a hot air oven or tunnel, or a steam autoclave).

As used herein, the term "curing" refers to the crosslinking of a polymer to form a strengthened or hardened polymer. A curing step may be performed in any conventional manner, such as, for example, hot air, steam, or hot molding.

The method may comprise extruding an elastomer composition, as described herein, to form an uncured preform article, and curing the uncured preform article.

The elastomer composition may be extruded in the presence of hot air to form the uncured preform. In at least one embodiment, the preform is cured using microwaves or a steam autoclave. In at least one other embodiment, the preform is cured without using microwaves or a steam autoclave.

In at least one embodiment, the extruded profile is heated in a microwave zone in the presence of air directly from the extruder, then passed through a longer heated air tunnel to complete the cure of the elastomeric profile. The method for manufacturing the article may be performed in a hot air tunnel, or any other known apparatus.

In at least one embodiment, the method for manufacturing the article can be formed continuously. Continuous manufacturing may allow for the production of a continuous article, such as a continuous seal, as opposed to seals that must be pieced together from smaller parts.

At least one embodiment of the present disclosure relates to a method for manufacturing hose. The method may comprise extruding a length of hose from an elastomer composition without curing the length of hose. The length of uncured hose may be collected and then cured, such as by exposing the uncured hose to steam.

At least one embodiment of the present invention relates to a process for curing an elastomer composition, the process comprising curing the elastomer composition in the presence of oxygen, wherein the composition comprises, consists essentially of, or consists of:
  at least one elastomer,
  at least one organic peroxide, and
  at least one cellulose compound. The process may further comprise mixing the at least one elastomer, the organic peroxide(s), and the cellulose compound(s), separately or together, and in any order, to provide the elastomer composition.

In at least one embodiment, conventional additives such as antioxidants (e.g., hindered phenols and polymeric quinoline derivatives), aliphatic process oils, and other process aids, pigments, dyes, tackifiers, waxes, reinforcing aids, UV stabilization agents, blowing agents and activators and antiozonants may also be added to any of the elastomer compositions described herein before, after and/or during the curing step.

Embodiments of Elastomeric Articles of the Present Invention

Embodiments of the present invention also provide an elastomeric article comprising a cured elastomer composition as described herein. Preferably, the elastomeric article is completely or substantially tack-free.

According to particular embodiments, the elastomeric article is a non-coating type (i.e., not a liquid coating).

Embodiments of the present invention may also include the process of dissolving high molecular weight solid polymers in a solvent, then removing the solvent to create a solid elastomer structure which is then hot air cured in a separate step (e.g., to provide a means to impregnate textiles). One example of this commercial use is the production of automotive air bags. Additional examples include cured-in-place solid elastomer automotive and truck head gaskets, in which case a liquid solution of solvent and a high molecular weight polymer, or blends of polymers, along with curatives, is applied to a metal surface. The solvent is removed, leaving a solid high molecular weight polymer of complex structure on the metal part. This solid rubber gasket on the metal part can then be heated to crosslink the polymer. In each case, the solvent must be completely removed from the solid polymer or elastomer; once the solid elastomer is free of solvent, the part can then be cured by applying heat to begin the crosslinking reaction. This is in contrast to paints, coatings and varnishes, wherein the cure process is concurrent with the solvent removal.

In at least one embodiment, the article may comprise a seal, hose, or gasket. Exemplary elastomeric articles that may be made in accordance with the compositions and methods of the present invention include O-rings, gaskets, diaphragms, seals, grommets, electrical insulators, shoe soles, septums, fittings, shrouds, sheets, belts, tubes, etc. The present disclosure also relates to automotive, industrial, or residential seals manufactured according to the compositions and methods disclosed herein.

An additional benefit of the present invention is that mold-fouling is reduced during the manufacture of elastomer articles. In prior methods, oxygen present in a mold would prevent the complete reaction of the elastomer, which resulted in a residue of uncured elastomer that would build up in the mold. This build-up needed to be cleaned out periodically.

According to additional embodiments, a method for reducing mold-fouling in the presence of oxygen comprises supplying an uncured elastomer composition to a mold, wherein the uncured elastomer composition comprises, consists essentially of, or consists of at least one elastomer (either saturated, unsaturated, or both) and an organic peroxide formulation as described herein.

The embodiments described herein are intended to be exemplary of the invention and not limitations thereof. One skilled in the art will appreciate that modifications to the embodiments and examples of the present disclosure may be made without departing the scope of the present disclosure. The embodiments of the invention are described above using the term "comprising" and variations thereof. However, it is the intent of the inventors that the term "comprising" may be substituted in any of the embodiments described herein with "consisting of" and "consisting essentially of" without departing the scope of the invention.

The following examples further illustrate the best mode contemplated by the inventors for the practice of their invention and are to be construed as illustrative and not in limitation thereof.

ABBREVIATIONS USED FOR THE RPA RHEOMETER TEST

ML (dN-m) is the minimum torque in deci-Newton-meters in a RPA rheometer test and relates to the viscosity of the elastomer composition at the test temperature.

MH (dN-m) is the maximum torque in deci-Newton-meters in a RPA rheometer test and relates to the maximum amount of crosslinking attained.

MH-ML (dN-m) is the relative degree of crosslinking in deci-Newton-meters.

Ts1 (min) is the time to attain a 1 dN-m increase from the minimum torque in minutes.

Ts2 (min) is the time to attain a 2 dN-m increase from the minimum torque in minutes.

Tc50 (min) is the time to attain 50% of the MH-ML (dN-m) cure state in minutes from the minimum torque.

Tc90 (min) is the time to attain 90% of the MH-ML (dN-m) cure state in minutes, from the minimum torque.

ABBREVIATIONS USED IN THE EXAMPLES

4-Hydroxy TEMPO or 4-OHT is 4-hydroxy-2,2,6,6-tetramethylpiperidin-1-oxyl.
CAB is cellulose acetate butyrate; see TABLE 2 for the various grades used.
Kleenex® is facial tissue available from Kimberly-Clark.
MBTS is benzothiazyl disulfide, also called mercaptobenzothiazole disulfide, also called Altax® from R. T. Vanderbilt.
MTBHQ is mono-tertiary butyl hydroquinone, CAS 1948-33-0.
N550 Carbon Black is where N550 is an ASTM designation for a particle size of carbon black
Naugard® 445 is 4,4'-bis($\alpha$-dimethylbenzyl)diphenylamine, an antioxidant from Chemtura.
phr means parts of ingredient added for every 100 parts of rubber in the formulation.
PEG is poly(ethylene glycol)
Primol® 352 is a white oil (100% non-aromatic) available from ExxonMobil.
Luperox® F90P is m/p-di(t-butylperoxy)diisopropyl benzene (90% peroxide content) available from Arkema, Inc.
Luperox® TBEC is t-butyl-2-ethylhexyl)monoperoxycarbonate.
SR-350 or TMPTMA is a crosslinking coagent; or trimethylolpropane trimethacrylate from Arkema Inc.
SR-351 is a crosslinking coagent, trimethylolpropane triacrylate, from Arkema Inc.
TAC is triallyl cyanurate a crosslinking coagent from Evonik.
TAIC is triallyl isocyanurate a crosslinking coagent from Mitsubishi Intl.
TMPTMA is a crosslinking coagent; Sartomer SR-350; or trimethylolpropane trimethacrylate from Arkema Inc.
TMQ or Stanguard® TMQ Powder is 2,2,4-trimethyl-1,2-dihydroquinoline, CAS#26780-96-1 from Harwick Standard Distribution Corporation.
Tung oil is pure, or substantially pure, bio-based oil preferably obtained by cold pressing seed.
Vamac® DP, is a peroxide curable poly(ethylene acrylic) elastomer from Chemours.
Vanfre® VAM is polyoxyethylene octadecyl ether phosphate a recommended processing aid for the elastomer, available from R.T. Vanderbilt.
VAMAC® DP an ethylene/acrylic copolymer.
Vistalon® 2504 EPDM is an poly(ethylene propylene diene) terpolymer elastomer from ExxonMobil; 50% ethylene, 4.7% ethylidene norbornene (ENB); ML(1+4)@125C, 25MU.
Vul-Cup® 40KE is m/p-di-t-butylperoxydiisopropylbenzene at 40% peroxide content on Burgess KE Clay.
Vultac® 5 is t-amyl phenol disulfide polymer, an arylpolysulfide polymer/oligomer also referred to as a poly(t-amylphenol disulfide); available from Arkema, Inc.

TESTS AND PROCEDURES

Procedure for Mixing Rubber and Rubber Sheet Preparation

The following procedure was used for mixing rubber and preparing the rubber sheet for hot air curing. A Brabender Plasti-Corder® with a 50 ml capacity bowl that is jacketed with the ability to run room temperature or heated oil was used. The mixer was equipped with removable sigma type blades. Using the specific gravity provided with the pre-compounded elastomer, small strips of rubber were slowly added to the bowl at a mixing speed of 20 to 25 rpm. The total amount of rubber added to the Brabender Plasti-Corder® bowl was equivalent to the weight needed to provide 48 ml of rubber volume so that there was sufficient volume to add the peroxide curatives to the rubber.

Out of this 48 ml of rubber, two small strips of rubber (equivalent to about 4 grams or no more than 5 ml) were held in reserve. All the rest of the rubber was slowly added to the bowl. Once all the rubber was added to the mixer and the rubber was flowing in the bowl, the mixer rpm was reduced to 15 rpm and the peroxide formulation for that experiment, which was pre-weighed in small Dixie® cups on a minimum of a three place balance, was slowly added to the mixing rubber. To make sure all of the residual peroxide was included in the mixing rubber, the two small reserve rubber strips were used to wipe the powder off the V-shaped metal portion of the mixer. This powder adhered to the rubber strip and the remaining two strips of rubber were introduced into the mixer.

The rpm was then increased back to 25 rpm for three minutes. After this time, the mixer speed was lowered to 10 rpm and the mixer head was unbolted and removed. Once the blades were no longer turning, the rubber around the blades was safely removed and placed on a sheet of Mylar® polyester. There was a small amount of rubber that was located at the head of the mixer blades within the inner hollow portion of the mixing chamber, which was removed last. The mixer head was re-assembled with the bolts and the mixer motor was started again at 20 rpm. The rubber which was removed last, which was trapped in the mixing chamber, was added first to the spinning blades, followed by the rubber that was taken off the blades. This provided for a more uniform mixing of elastomer. The rpm was then increased to 25 rpm and held there for 3 minutes. After this time, the mixer speed was set to 10 rpm and the mixer head unbolted and removed. Once removed, the mixer blade motion stopped and it was again safe to remove all of the rubber from the mixer's bowl and blades.

The warm rubber was then formed into a tight ball and placed between two Mylar® polyester sheets. This sandwich was placed in a warmed hydraulic powered Carver press where the press may be set to between room temperature and 60° C., depending upon the elastomer and the peroxide curatives being used. The ball of rubber was pressed flat between the two heavy Mylar® polyester sheets. Wearing nitrile gloves, the press was opened and the Mylar® polyester sheet sandwich containing the flattened rubber was removed. The top sheet was removed and the rubber was rolled into a tube. This was re-sandwiched and flattened again. The sheet was rolled again, but 90 degrees to the original roll direction, and flattened again. This was repeated a third time, and care was taken to flatten to an approximate thickness of ⅛ inch. The sandwich was placed on the bench top and covered with a metal sheet where the rubber was allowed to cool. It was then removed and stored in a tightly-sealed polyethylene bag. These sheets were then cut with scissors or using a sharp metal circle punch, to make small flat circle sheets of uncured rubber for the Rheometer cure evaluation, and square flat sheets for the hot air oven testing using the "Facial Tissue Paper Test" described below.

Facial Tissue Paper Test

The following procedure was used to test the surface tack of the rubber sheet after curing in a hot air oven. This procedure is also referred to as a "Facial Tissue Paper Test" for surface tackiness of a rubber sheet cured in a hot air oven.

A flat sheet of uncured rubber was prepared with dimensions of ⅛" thick by 2" wide and 3" long, and was hung carefully in a pre-heated hot air oven set to 205° C. for 15 minutes. The sheet was hung in the oven by metal clamps from a metal rack to expose all sides of the sheet to the hot air. After 15 minutes of cure, the rubber sheet was promptly removed and placed on an aluminum foil-covered piece of cardboard. It was covered immediately with a Kleenex® Facial Tissue and very firm pressure was immediately applied by hand to the entire rubber surface, followed by applying a 1800 gram weight for five minutes. After the rubber cooled to room temperature, the soft facial tissue paper was carefully removed to examine the rubber surface for any tissue paper fibers that may have adhered to the surface. If a great many tissue paper fibers adhere, this indicates a poor surface cure, or one that has a high amount of surface tackiness.

As used herein, the Surface Tackiness Number=(% of surface with no paper fibers÷10). The Surface Tackiness number can range from 10 to 0. A completely tack-free cured rubber surface with no tissue paper fibers has a rating of 10. A very poorly cured rubber surface that is completely covered in tissue paper fibers is rated a 0. If 90% of the surface has no tissue paper fibers attached, the rating is a 9, if 70% of the surface has no tissue paper fibers attached, the rating is a 7, etc.

Rheometer Procedures

The following procedure was used for moving die rheometer and RPA (Rubber Process Analzer) evaluations. For the Alpha Technologies MDR rheometer, test method ASTM D5289-12 "Standard Test Method for Rubber Property—Vulcanization Using Rotorless Cure Meters" was used. Test method ASTM D6204 was used with either a 0.5 degree or 1.0 degree arc and 100 cpm frequency of oscillation at cure temperatures appropriate for the curative system, e.g., 185° C. for the examples below.

When conducting rheometer evaluations, approximately 5 to 6 grams of elastomer (depending upon the density of the final compound) were used to completely fill the upper and lower dies of the rheometer. The uncured rubber was cut from the pressed sheet formed by the procedure described above. The rubber was cut into small round discs about 1.25 inches in diameter and placed between two Dartek® sheets. This sandwich was then placed in the rheometer for testing following ASTM D5289.

Following ASTM D6601 for after cure dynamic testing, a test with the RPA using the stress relaxation feature of the instrument with a 3 degree arc applied strain was applied to gauge the crosslinked elastomer's ability to serve as a gasket or seal. This purpose was similar to the percent compression test following standard NF ISO 815. The loss of the elastic modulus or S' (dN-m) is followed versus time, for several minutes. The rate in loss of elastic modulus reflects the percent compression set performance. The lowest percent compression values for cured rubber samples will have the lowest loss in the elastic modulus or S' (dN-m) over a one minute period at a test temperature of 185° C. or higher.

% Compression Set Procedures

The following procedures were used for compression set evaluations. The standardized test methods for % compression set were NF ISO 815 and/or ASTM D395, which are suitable for Ambient and High Temperature application testing. Specifically, in Example 1, NF ISO 815 was used, wherein samples for the test were first cured at 190° C. to form a cylinder of 6.3±0.3 mm height and 13±0.5 mm diameter using a curing time of Tc90+8 minutes, then test pieces were placed in the NF ISO 815 device to compress 25% at 150° C. for 24 hours. After this time, samples were released and placed on a wooden board at ambient temperature for 30 minutes before being measured for change in height.

Tensile Testing Procedures

The following procedures were used for tensile testing. Tensile properties were determined by following the standard NF ISO 37 and/or ASTM D412. First, sheets of 1.5 mm thick were cured under pressure in a pneumatic press. The conditions of curing were determined from the Tc90 (minute) 90% of cure time result for the compound when tested on the MDR or RPA rheometer at 190° C. The curing temperature was 190° C. and the curing time was Tc90+8 minutes. Then, dumbbells were cut from the 1.5 mm cured sheet using the appropriate die designated by NF ISO 37 and/or ASTM D412. Finally, tensile tests were performed on the dumbbells using an INSTRON® 5565 tensile machine. A speed of 200 mm/min was used.

EXAMPLES

Example 1

In this example, cellulose acetate butyrate (CAB) was combined with an organic peroxide to hot air cure an EPDM elastomer composition. Four different grades of cellulose acetate butyrate (CAB) listed in TABLE 2 were tested in combination with Vul-Cup® 40KE for curing the EPDM Masterbatch elastomer composition described in TABLE 1 at 205° C. for 15 minutes in a hot air oven. The results are provided in TABLE 3.

TABLE 1

"EPDM MB" Masterbatch Formulation

| Ingredient | Phr |
| --- | --- |
| Vistalon ® 2504 EPDM | 100.0 |
| N550 Carbon Black | 100.0 |
| Primol ® 352 white process oil | 40.0 |
| PEG Polyethylene glycol | 3.0 |
| Stanguard ® TMQ Powder (antioxidant) | 1.0 |
| Total weight of the masterbatch | 244.0 |

TABLE 2

| CAB Grade | Wt % Butyryl | Wt % Acetyl | Viscosity (poise) |
| --- | --- | --- | --- |
| 171-15 | 17.00% | 1.50% | 57.37 |
| 321-0-1 | 32.50% | 17.50% | 0.38 |
| 551-0-1 | 53.00% | 2.00% | 0.038 |
| 551-0-2 | 51.88% | 1.32% | 0.214 |

TABLE 3

Effect of using Cellulose Acetate Butyrate in combination with Vul-Cup ® 40KE when curing an EPDM formulation in a hot air oven

| Sample # | 1 | 2 | 3 | 4 | 5 | 6 | 7 | 8 |
| --- | --- | --- | --- | --- | --- | --- | --- | --- |
| Table 1 "EPDM MB" | 244 | 244 | 244 | 244 | 244 | 244 | 244 | 244 |
| Vul-Cup ® 40KE | 6 | 6 | 6 | 6 | 6 | 6 | 6 | 6 |
| CAB 171-15 | 3 | 6 | — | — | — | — | — | — |
| CAB 321-0-1 | — | — | 3 | 6 | — | — | — | — |
| CAB 551-0-1 | — | — | — | — | 3 | 6 | — | — |
| CAB 551-0-2 | — | — | — | — | — | — | 3 | 6 |
| RPA Rheometer 185° C., 1.0° arc, 100 cpm, (1.677 Hz) | | | | | | | | |
| ML (dN-m) | 1.46 | 1.45 | 1.38 | 1.38 | 1.40 | 1.26 | 1.46 | 1.30 |
| MH (dN-m) | 19.66 | 19.03 | 18.71 | 18.11 | 16.85 | 14.98 | 18.48 | 17.15 |
| MH-ML (dN-m) | 18.20 | 17.58 | 17.34 | 16.74 | 15.45 | 13.72 | 17.12 | 15.85 |
| Ts1 (min) | 0.42 | 0.43 | 0.42 | 0.43 | 0.43 | 0.44 | 0.42 | 0.43 |
| Ts2 (min) | 0.53 | 0.54 | 0.54 | 0.54 | 0.55 | 0.57 | 0.54 | 0.55 |
| Tc90 (min) | 3.51 | 3.51 | 3.45 | 3.38 | 3.13 | 3.14 | 3.35 | 3.16 |
| Curing Rubber Sheet in a Hot Air Oven at 205° C. for 15 minutes, then using the facial tissue test | | | | | | | | |
| 10 = no tack; 0 = 100% tacky | 10 | 10 | 9.8 | 9.9 | 9.7 | 10 | 9.8 | 9.9 |

Unexpectedly, excellent surface cure of an EPDM compound was obtained when using 6 phr Vul-Cup® 40KE in combination with either 3 phr or 6 phr of cellulose acetate butyrate (CAB) in the 205° C., 15 minute hot air oven test for surface tackiness. Based on the results shown in TABLE 3, the CAB grade 171-15, which had the lowest butyryl content, provided a higher state of cure based upon the RPA rheometer results for MH dN-m and MH-ML (dN-m), and also provided a completely tack-free surface.

Example 2

In this example, cellulose acetate butyrate (CAB) was used to significantly improve the surface tackiness of the EPDM masterbatch provided in TABLE 1. The grades of cellulose acetate butyrate (CAB) used in this example are provided in TABLE 4.

TABLE 4

| CAB Grade | Wt % Butyryl | Wt % Acetyl | Viscosity (poise) |
|---|---|---|---|
| 171-15 | 17.00% | 1.50% | 57.37 |
| 321-0-1 | 32.50% | 17.50% | 0.38 |
| 551-0-1 | 53.00% | 2.00% | 0.038 |

The behavior of cellulose acetate butyrate (CAB) was tested using an organic peroxide Luperox® F90P blended with two sulfur containing compounds, Vultac® 5 and MBTS, in the EPDM masterbatch of TABLE 1. Compounded EPDM samples were tested in a rheometer at 185° C. and also cured in a hot air oven at 205° C. for 15 minutes. The tackiness of the hot rubber sheet surfaces was then immediately tested by the Facial Tissue Paper Test.

TABLE 5

| Sample # | 1 | 2 | 3 | 4 |
|---|---|---|---|---|
| Parts EPDM MB Table 1 | 244 | 244 | 244 | 244 |
| phr Luperox ® F90P | 4.67 | 4.67 | 4.67 | 4.67 |
| phr Vultac ® 5 | 1.87 | 1.87 | 1.87 | 1.87 |
| phr MBTS | 0.46 | 0.46 | 0.46 | 0.46 |
| phr CAB 171-15 | — | 6.00 | — | — |
| phr CAB 321-01 | — | — | 6.00 | — |
| phr CAB 551-01 | — | — | — | 6.00 |
| RPA Rheometer Cure at 185° C., 1° arc, 100 cpm (1.667 Hz) 15 minutes | | | | |
| ML (dN-m) | 1.27 | 1.37 | 1.30 | 1.20 |
| MH (dN-m) | 24.73 | 24.56 | 22.43 | 19.03 |
| MH − ML (dN-m) | 23.46 | 23.19 | 21.14 | 17.84 |
| Ts1 scorch time (min.) | 0.44 | 0.44 | 0.45 | 0.47 |
| Ts2 scorch time (min.) | 0.54 | 0.54 | 0.55 | 0.59 |
| Tc50 (minutes) | 1.25 | 1.26 | 1.23 | 1.30 |
| Tc90 (minutes) | 3.11 | 3.10 | 3.05 | 3.09 |
| Hot air oven curing at 205° C. for 15 min, then the facial tissue testing. | | | | |
| Surface Tack: 10 = no tack; 0 = 100% tacky | 8.0 | 9.8 | 9.8 | 8.5 |

As shown by the data in TABLE 5, the CAB Samples 2, 3 and 4 provided significantly improved hot air cured elastomer surfaces compared to the control Sample 1. The use of cellulose acetate butyrate provided an unexpected improvement in the elastomer surface cure performance when used in combination with at least one sulfur containing compound. The combination of the cellulose acetate butyrate and the two sulfur containing compounds combined with the peroxide (in this case Luperox® F90P) provided a well cured surface when curing the elastomer in the hot air oven.

Example 3

TABLE 6

| Run # | 1 | 2 |
|---|---|---|
| Vamac ® DP | 100.00 | 100.00 |
| N550 Carbon Black | 87.00 | 87.00 |
| Naugard ® 445 antioxidant | 1.00 | 1.00 |
| Stearic acid | 0.50 | 0.50 |
| Vanfre ® YAM | 0.50 | 0.50 |
| Di-Cup 40 C | 6.00 | 6.00 |
| 72% TAIC on silica | 2.00 | 2.00 |
| Cellulose Acetate Butyrate CAB 321-0-1 | 0.00 | 4.00 |
| RPA, 173° C., 1° arc, 100 cpm: MH (dN-m) | 17.90 | 18.10 |
| Hot air oven curing @ 200° C. for 15 minutes followed by the tack test | | |
| Facial Tissue Tackiness Test where: 10 = no tack; 0 = 100% tacky | 0 | 8.0 |

In Example 3, TABLE 6 shows the novel peroxide composition (Run #2) comprising dicumyl peroxide, the non-biobased TAIC coagent, and CAB 321-0-1 (cellulose acetate butyrate) which when compounded into the elastomer and cured, provided a very good hot air cured surface when crosslinking Vamac® DP [a poly(ethylene acrylate) copolymer from DuPont] in a hot air oven at 200° C. for 15 minutes. The elastomer surface provided a tack test rating of 8 out of 10, compared to a very tacky surface of 0 out of 10 for the peroxide control (Run #1).

What is claimed is:

1. An organic peroxide formulation for curing solid elastomers, said organic peroxide formulation being a waterless solid powder comprising:
   at least one organic peroxide;
   at least one sulfur-containing compound; and
   a cellulose compound consisting of one or more of cellulose acetate butyrate (CAB) having a butyryl content less than 40%, cellulose acetate proprionate, cellulose acetate, cellulose, micronized cellulose, cellulose gum, microcrystalline cellulose, carboxymethyl cellulose, hydroxypropyl cellulose (HPC), hydroxypropylmethyl cellulose (HMPC), hydroxyethyl cellulose, methyl cellulose, ethyl cellulose, cellulose acetate phthalate, ethyl hydroxyethyl cellulose, hydroxyethyl methyl cellulose, ethyl methyl cellulose, or a combination thereof,
   wherein the amounts of the at least one organic peroxide and the at least one cellulose compound are selected such that the waterless powder formulation cures a solid elastomer composition in the full or partial presence of oxygen and in the absence of water, the amount of the at least one cellulose compound being from 15 wt% to 70 wt% based on the total organic peroxide formulation.

2. The organic peroxide formulation of claim 1, wherein the organic peroxide formulation cures said solid elastomer composition that comprises at least one saturated solid elastomer, wherein the cured solid elastomer composition is completely or substantially tack-free.

3. The organic peroxide formulation of claim 1 further comprising:
   at least one coagent which may be selected from the group consisting of bio-based and non-bio based compounds.

4. A solid elastomer composition which is waterless and cures in the full or partial presence of oxygen, said composition comprising:
    at least one solid elastomer,
    at least one organic peroxide formulation of claim 1,
    wherein the solid waterless elastomer composition cures in the full or partial presence of oxygen and in the absence of water.

5. The solid elastomer composition of claim 4 comprising a solid elastomer masterbatch, wherein the solid elastomer masterbatch comprises the at least one solid elastomer and one or more additives selected from the group consisting of carbon black, at least one process oil, at least one antioxidant, at least one mold release agent, at least one heat stabilizer, and a combination thereof.

6. The solid elastomer composition of claim 4, wherein the at least one solid elastomer is selected from the group consisting of ethylene-propylene-diene terpolymer (EPDM), poly(ethylene vinylacetate), poly(ethylene acrylate) copolymer, fluoroelastomers (FKM, FFKM, FVMQ), vinyl silicone rubber (VMQ), nitrile rubber (NBR), acrylonitrile-butadiene-styrene (ABS), styrene butadiene rubber (SBR), styrene-butadiene-styrene block copolymers (SBS), polybutadiene rubber (BR), styrene-isoprene-styrene block copolymers (SIS), partially hydrogenated acrylonitrile butadiene copolymer (HNBR), natural rubber (NR), synthetic polyisoprene rubber (IR), neoprene rubber (CR), polychloropropene, bromobutyl rubber (BIIR), chlorobutyl rubber, and combinations thereof.

7. The solid elastomer composition of claim 4, wherein the at least one organic peroxide formulation comprises at least one organic peroxide selected from the group consisting of dialkyl peroxides, diperoxyketals, mono-peroxy carbonates, cyclic ketone peroxides, diacyl peroxides, organosulfonyl peroxides, peroxyesters and solid peroxydicarbonates.

8. An elastomeric article comprising the cured solid elastomer composition of claim 4 that is completely or substantially tack-free.

9. A process for curing the solid elastomer composition of claim 4, said process comprising:
    curing the solid elastomer composition in the presence of oxygen.

10. A solid elastomer composition which is waterless and cures in the full or partial presence of oxygen, said composition comprising:
    at least one solid elastomer,
    at least one organic peroxide formulation for curing solid elastomers in the presence of oxygen and which is a waterless solid powder comprising:
    at least one organic peroxide selected from the group consisting of dialkyl peroxides, diperoxyketals, mono-peroxy carbonates, cyclic ketone peroxides, diacyl peroxides, organosulfonyl peroxides, peroxyesters and solid peroxydicarbonates,
    a cellulose compound consisting of one or more of cellulose acetate butyrate (CAB) having a butyryl content less than 40%, cellulose acetate proprionate, cellulose acetate, cellulose, micronized cellulose, cellulose gum, microcrystalline cellulose, carboxymethyl cellulose, hydroxypropyl cellulose (HPC), hydroxypropylmethyl cellulose (HMPC), hydroxyethyl cellulose, methyl cellulose, ethyl cellulose, cellulose acetate phthalate, ethyl hydroxyethyl cellulose, hydroxyethyl methyl cellulose, ethyl methyl cellulose, or a combination thereof, and
    at least one coagent which may be selected from the group consisting of bio-based and non-bio based compounds,
    at least one sulfur containing compound,
    wherein the amounts of the at least one organic peroxide and the at least one cellulose compound are selected such that the waterless powder formulation cures a solid elastomer composition in the full or partial presence of oxygen and in the absence of water, the amount of the at least one cellulose compound being from 15 wt% to 70 wt% based on the total organic peroxide formulation.

* * * * *